US010261723B1

(12) United States Patent
Faibish et al.

(10) Patent No.: US 10,261,723 B1
(45) Date of Patent: Apr. 16, 2019

(54) POSIX COMPLIANT FLASH SERVERS

(71) Applicant: EMC Corporation, Hopkinton, MA (US)

(72) Inventors: Sorin Faibish, Newton, MA (US); Dominique P. Cote, Cambridge, MA (US); Dennis Pei Jean Ting, Groton, MA (US); John M. Bent, Los Alamos, NM (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 14 days.

(21) Appl. No.: 14/502,593

(22) Filed: Sep. 30, 2014

(51) Int. Cl.
*G06F 3/06* (2006.01)

(52) U.S. Cl.
CPC ............ *G06F 3/0659* (2013.01); *G06F 3/061* (2013.01); *G06F 3/067* (2013.01); *G06F 2003/0692* (2013.01)

(58) Field of Classification Search
CPC ................. G06F 3/1209; G06F 9/3017; G06F 2212/1004
USPC ............................................................. 710/5
See application file for complete search history.

(56) References Cited

U.S. PATENT DOCUMENTS

| | | | | |
|---|---|---|---|---|
| 6,917,990 B2* | 7/2005 | Henry | .................. | G06F 3/0611 710/29 |
| 7,007,044 B1* | 2/2006 | Rafert | ................. | G06F 11/2082 707/655 |
| 7,302,500 B2* | 11/2007 | Powell | .................... | G06F 3/061 710/20 |
| 7,721,009 B2* | 5/2010 | Moreira | ............ | G06F 17/30171 710/20 |
| 8,819,311 B2* | 8/2014 | Liao | ........................ | G06F 9/544 710/50 |
| 9,158,540 B1* | 10/2015 | Tzelnic | ................. | G06F 11/108 |
| 2003/0014521 A1* | 1/2003 | Elson | .................... | G06F 9/5011 709/225 |
| 2005/0005033 A1* | 1/2005 | Powell | .................... | G06F 3/061 710/5 |
| 2010/0262594 A1* | 10/2010 | Venkataraja | ...... | G06F 17/30067 707/715 |
| 2013/0041969 A1* | 2/2013 | Falco | ...................... | G06F 9/546 709/212 |
| 2013/0185457 A1* | 7/2013 | Campbell | ............... | G06F 3/067 710/5 |

\* cited by examiner

*Primary Examiner* — Idriss N Alrobaye
*Assistant Examiner* — Getente A Yimer
(74) *Attorney, Agent, or Firm* — Krishnendu Gupta; Jason Reyes; Ann-Marie Dinius

(57) ABSTRACT

A computer-executable method, computer program product, and system for managing I/Os from a legacy compliant Application on a host, wherein the host is in communication with a data storage system including a burst buffer node, the computer-executable method comprising receiving a POSIX compliant message from the Application, wherein the message is associated with data on the data storage system and processing the POSIX message on the data storage system.

20 Claims, 9 Drawing Sheets

US 10,261,723 B1

POSIX COMPLIANT FLASH SERVERS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, computer program product, and system for managing I/Os from a legacy compliant Application on a host, wherein the host is in communication with a data storage system including a burst buffer node, the computer-executable method comprising receiving a POSIX compliant message from the Application, wherein the message is associated with data on the data storage system and processing the POSIX message on the data storage system.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
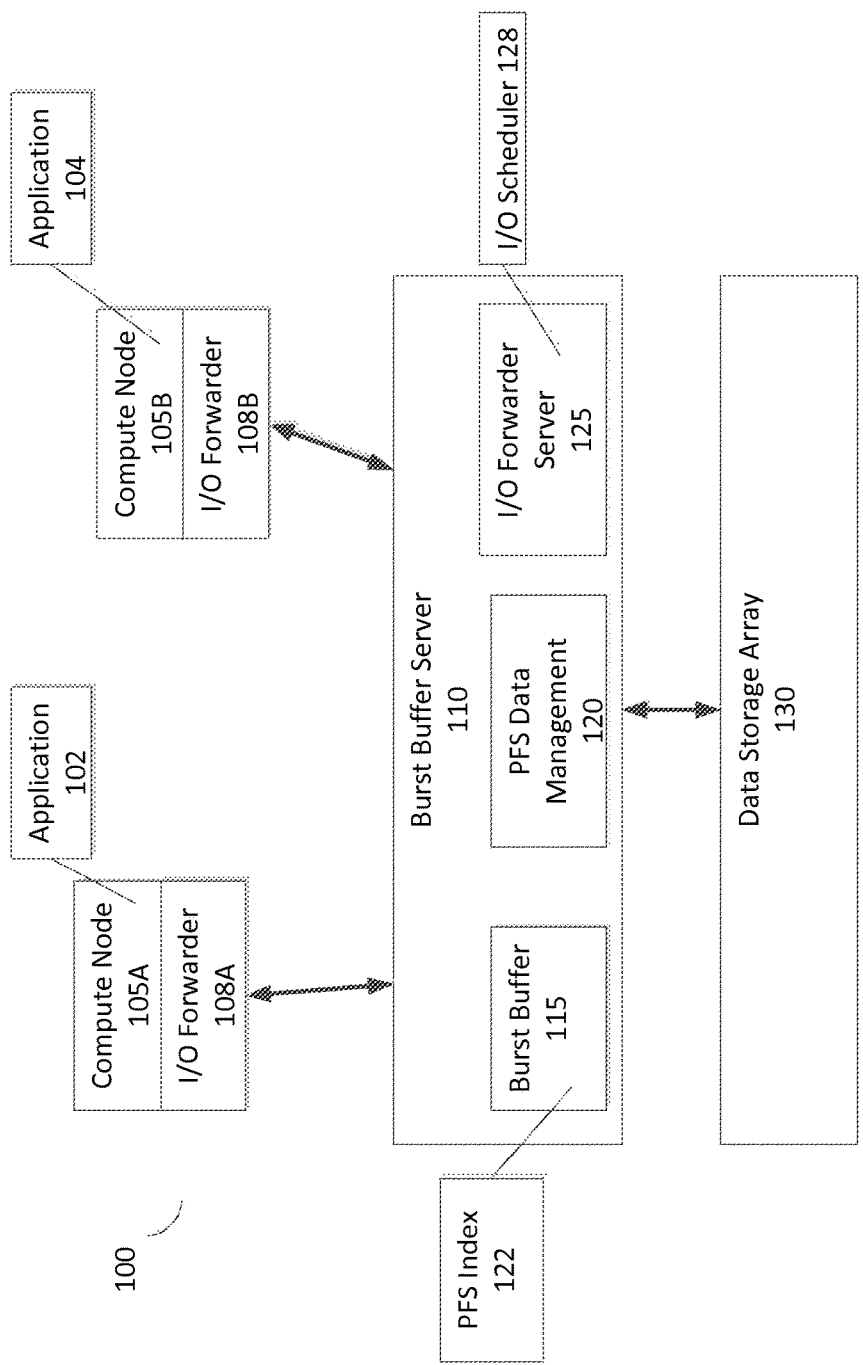
FIG. 1 is a simplified illustration of a POSIX compliant application utilizing a burst buffer server, in accordance with an embodiment of the present disclosure.

Traditionally, industry relies upon hundreds, if not thousands, of legacy applications to analyze and/or process large data sets. Conventionally, legacy applications have been built upon legacy technology, such as POSIX, which are not always compatible with newer technology. Typically, to coexist with newer technology, legacy applications have to be re-written to be aware of newer capabilities of newer technology. Generally, enabling legacy applications to execute and/or co-exist more efficiently with newer technology would be beneficial to the data storage industry.

Typically, POSIX is a family of standards specified by the IEEE for maintaining compatibility between operating systems. Conventionally, POSIX defines an application programming interface (API), along with command line shells and utility interfaces, for software compatibility with variants of Unix and other operating systems. Traditionally, many user-level programs, services, and utilities were standardized along with program-level services, including basic I/O services. Generally, POSIX also defines a standard threading library API which is supported by most operating systems. Conventionally, POSIX standards work well for data storage and/or resources co-located with a compute node and does not provide advance capabilities to interact with advance data storage systems.

Conventionally, supporting POSIX in a distributed storage server cluster architecture is a challenge for any distributed file system. Typically, there are tradeoffs between strict compliance with POSIX standards and performance of applications and applications I/O. Traditionally, strict POSIX compliance requires a strict locking protocol that will require each application I/O to be committed to disk before sending the next application I/O.

Traditionally, POSIX I/O implementations affect performance by using a tight locking mechanism and synchronize meta data between all of the nodes of a cluster for each I/O operation. For example, typically, POSIX compliant parallel file systems, such as, GPFS and Lustre, have a big performance penalty when multiple writers attempt to write to a single file. Conventionally, GPFS and Lustre require tight locks and synchronized I/Os.

In many embodiments, the current disclosure may enable legacy compliant applications executing on one or more compute nodes to utilize advanced data storage systems. In various embodiments, the current disclosure may enable a legacy compliant application to use an advanced data storage system without modifying the legacy compliant application. In certain embodiments, a legacy compliant application may interact with data storage on an advanced storage system without being aware that the data storage is remotely located. In some embodiments, the current embodiment may enable creation of a forwarding layer which may enable a legacy compliant application to communicate with and/or utilize an advance data storage system.

In most embodiments, an advanced data storage system may include a burst buffer node enabled to communicate with one or more data storage arrays. In various embodiments, a burst buffer node may include an I/O forwarding server which may be enabled to synchronize I/Os and/or maintain POSIX compliance for compute nodes in communication with the burst buffer node. In certain embodiments, a burst buffer node may include a Parallel File System Management module. In most embodiments, a parallel file system may be a type of distributed file system that may distribute file data across multiple servers and may provide for concurrent access on the file system. In various embodiments, a parallel file system management module may enable management of data within a data storage system. In some embodiments, a parallel file system management module may enable management and/or interaction with the parallel file system implemented on the data storage system.

In many embodiments, the current disclosure may enable a data storage system to receive POSIX I/Os and process the POSIX I/Os asynchronously. In various embodiments, the current disclosure may enable a POSIX compliant application to operate asynchronously without modifying the POSIX compliant application. In most embodiments, the current disclosure may enable creation of an I/O forwarder server may enforce I/O ordering and may allow asynchronous write operations. In various embodiments, an I/O forwarder may enable a POSIX compliant application to use remote storage as if the remote storage was local storage. For example, in some embodiments, a POSIX compliant application may be enabled to send unaugmented POSIX commands to an I/O forwarder which may enable utilization of one or more burst buffer servers. In certain embodiments, an I/O forwarder will enable a POSIX compliant application to utilize a data storage system without being aware that POSIX commands may be sent external to the compute node.

In many embodiments, an I/O forwarder client may reside on each compute node to facilitate communication between POSIX application on a compute node and available burst buffer servers. In some embodiments, the current disclosure may enable pushing the decision of synchronization into the burst buffer server. In many embodiments, the current disclosure may enable a burst buffer to utilize synchronized I/O only when a read request for the in-process write I/O and may reduce the performance impact in cases where there may be a read request during write I/Os. In many embodiments, an I/O forwarding client may be used as an API call within a compute node to forward POSIX I/O operations to a burst buffer server. In various embodiments, the current disclosure may enable implementation of an I/O forwarder enabled to receive I/Os from a Parallel File System (PFS) such as Parallel Virtual File System (PVFS) and/or CEPH.

Refer to the example embodiment of FIG. 1. FIG. 1 is a simplified illustration of a POSIX compliant application utilizing a burst buffer server, in accordance with an embodiment of the present disclosure. Data storage system 100 includes burst buffer server 110 and Data Storage Array 130. Data storage system 100 is in communication with compute node 105A and compute node 105B. Compute node 105A includes I/O forwarder module 108A which enables POSIX compliant applications on Compute node 105A to communicate with burst buffer server 110. Compute node 105B includes I/O forwarder 108B which enables POSIX compliant applications on compute node 105B to communicate with burst buffer server 110. POSIX compliant Application 102 is hosted and executing on compute node 105A. POSIX compliant Application 104 is hosted and executing on compute node 105B.

Burst buffer server 110 includes I/O Forwarder server module 125, which includes I/O Scheduler 128. Burst buffer server 110 includes Parallel File System (PFS) Data Management module 120 which implements and manages a PFS on Burst buffer server 110 using burst buffer 115 and data storage array 130. PFS Data management module 120 maintains PFS index 122 on burst buffer 115. Compute node 105A is enabled to execute application 102 and is enabled to send and/or receive synchronized POSIX I/Os using I/O Forwarder client 108A. I/O Forwarder client 108A is enabled to provide a POSIX compliant API which is enabled to receive POSIX commands and/or POSIX compliant I/Os from any application running on compute node 105A. I/O forwarder client 108A is enabled to send POSIX I/Os to I/O Forwarder server module 125 within burst buffer server 110. I/O Forwarder Server module 125 is enable to receive and analyze POS IX I/Os and synchronized the POSIX I/OS at burst buffer server 110. After I/O Forwarder server module 125 receives a write I/O Request, I/O Forwarder server module 125 is enabled to respond with a write I/O acknowledgment message and place the received write I/O request in I/O scheduler 128. I/O forwarder server 125 is enabled to process I/O requests in I/O scheduler 128 using PFS data management module 120. PFS data management module 120 is enabled to augment data storage on burst buffer server 110 as needed.

I/O Forwarder Server module 125 processes each write I/O request by communicating with pfs data management module 120. I/O Forwarder Server module 125 requests data storage be allocated for the write I/O request, that the write I/O request be placed within data storage, and acknowledges completion of the transaction when PFS Data management module 120 has completed the write. Upon completion of each transaction, data stored using PFS Data management module 120 is in a consistent state. In many embodiments, if an I/O forwarder server module receives a read I/O request, the I/O forwarder server module may queue the read I/O request until data on the burst buffer server has reached a consistent state. In various embodiments, a consistent state may include completion of all pending write I/O requests received before the read I/O request. In certain embodiments, a consistent state may include completion of pending write I/O requests which may affect the read I/O request.

Figure 2:
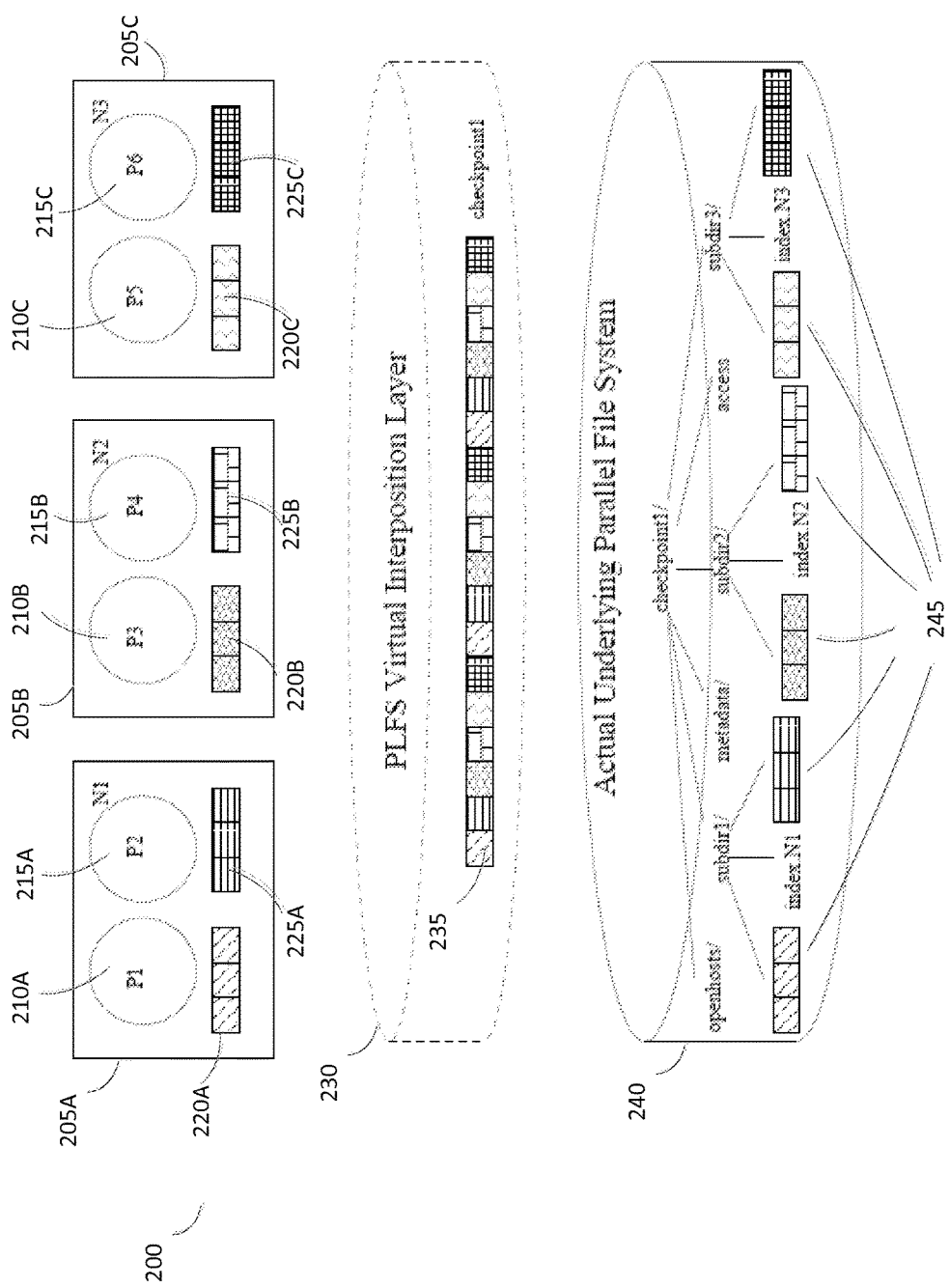
FIG. 2 is a simplified illustration of an example Parallel file system (PFS), in accordance with an embodiment of the present disclosure.

Refer now to the example embodiment of FIG. 2. FIG. 2 is a simplified illustration of an example Parallel file system (PFS), in accordance with an embodiment of the present disclosure. As shown, PLFS 200 reorganizes an N−1 strided checkpoint file235 onto the underlying parallel file system 240. Compute nodes 205A, 205B, 205C include processors 210 A, 215A, 2105B, 215B, 210C, 215C and data buffers 220A, 225A, 220B, 225B, 220C, 225C containing process states of processors 210 A, 215A, 2105B, 215B, 210C, 215C. Data buffer 220A is associated with processor 210A and data buffer 225A is associated with processor 215A. Data buffer 220B is associated with processor 210B and data buffer 225B is associated with processor 215B. Data buffer120C is associated with processor 210C and data buffer 225C is associated with processor 215C. Processors 210A, 215A, 210B, 215B, 210C, 215C create checkpoint file 235 on PLFS 230 causing PLFS 230 to create container structure 245 on underlying parallel file system 240. Container structure 245 includes a top-level directory and several sub-directories to store application data. In many embodiments, for each write, PLFS may append incoming data to the corresponding data file and may append a record onto the appropriate index file. In various embodiments, each record may contain the length of the write, its logical offset, and a pointer to its physical offset within the data file to which it was appended. In other embodiments, to resolve reads, PLFS may aggregate each index file to create a lookup table for the logical file.

Figure 3:
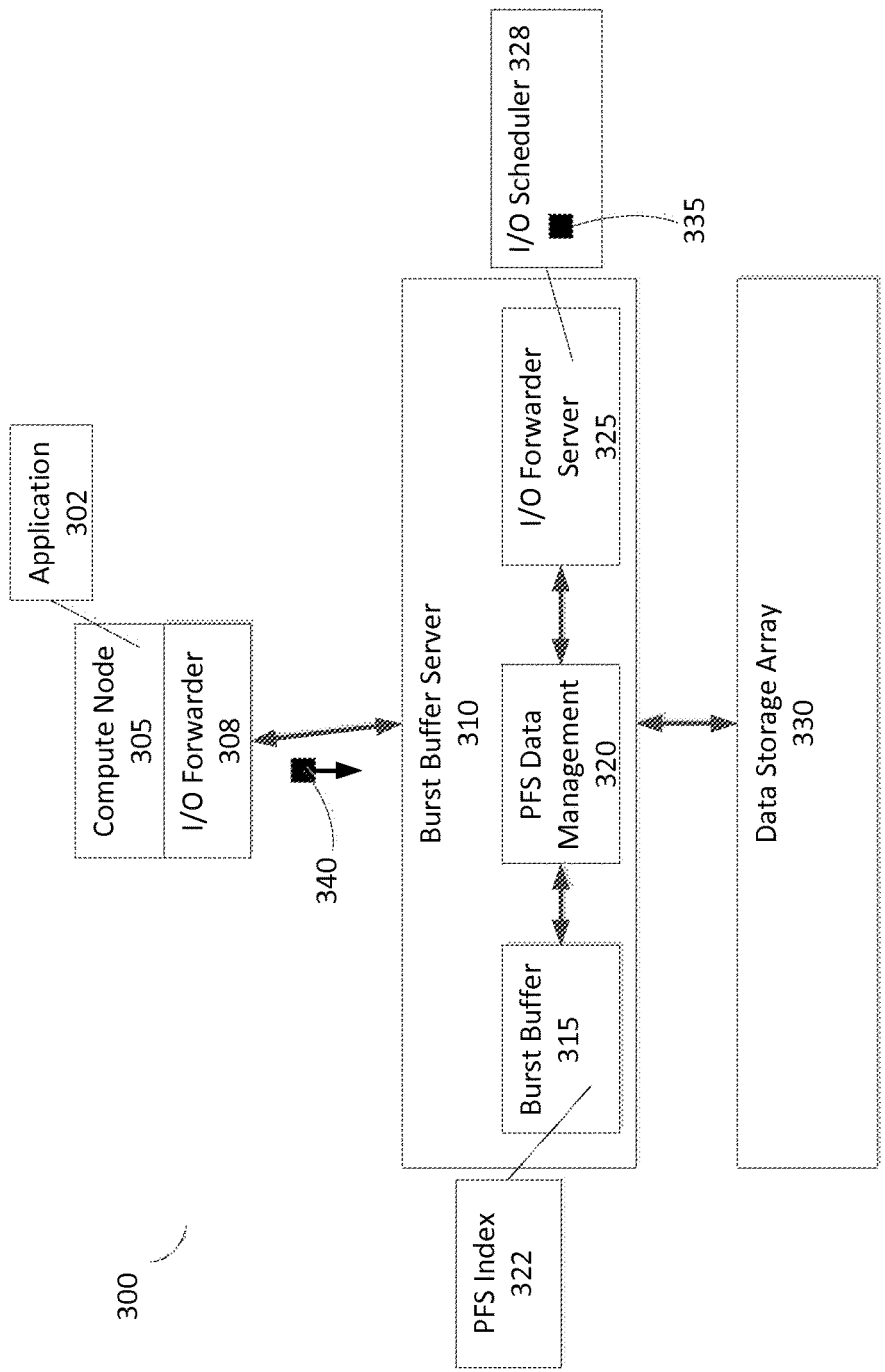
FIG. 3 is a simplified illustration of a POSIX compliant application on a compute node writing to an advanced data storage system, in accordance with an embodiment of the present disclosure.

Refer to the example embodiment of FIG. 3. FIG. 3 is a simplified illustration of a POSIX compliant application on a compute node writing to an advanced data storage system, in accordance with an embodiment of the present disclosure. Data storage system 300 includes burst buffer server 310 and data storage array 330. Compute node 305 is in communication with burst buffer server 310. Data storage array 330 is in communication with burst buffer server 310. Burst buffer server 310 includes I/O forwarder server module 325, PFS Data management module 320, and burst buffer 315. In many embodiments, a burst buffer may include one or more portions of non-volatile data storage. In various embodiments, non-volatile data storage may include flash data storage. Application 302 is a POSIX compliant application executing on compute node 305. PFS Data management module 320 enables creation of a Parallel Logged File System on burst buffer server 310 using burst buffer 315 and data storage array 330.

In this embodiment, I/O Forwarder client 308 is enabled to execute on compute node 305. I/O Forwarder client 308 enables Application 302 to send POSIX compliant I/O commands to burst buffer server 310 without modifying application 302. As shown, Application 302 is not aware that burst buffer server 310 is providing data storage for application 302. Application 302 is unaware that data storage from burst buffer server 310 is not local to compute node 305. As shown, Application 302 sends a write I/O request to burst buffer server 310 using I/O forwarder client 308. I/O forwarder client 308 directs the write I/O request from Application 302 to I/O Forwarder server module 325 within Burst Buffer server 310 using message 340. I/O Forwarder server module 325 places the write I/O request in I/O Scheduler 328 and immediately responds to the write I/O request which enables Application 302 to continue executing. I/O Scheduler 328 manages the received write I/O request, as shown by block 335. I/O Forwarder server module 325 communicates with PFS data management Module 320 to determine whether data storage managed by burst buffer server 310 is consistent. I/O Forwarder Server module 325 is enabled to process block 335 in I/O Scheduler 328 and direct PFS Data management module 320 to write block 335 into the file system. I/O Forwarding server module 325 directs PFS Data management module 320 to 1) allocate space for block 335, 2) place block 335 within burst buffer 315, and 3) waits for an acknowledgment of completion which enables I/O forwarder server module 325 to determine when data stored is consistent.

Figure 4:
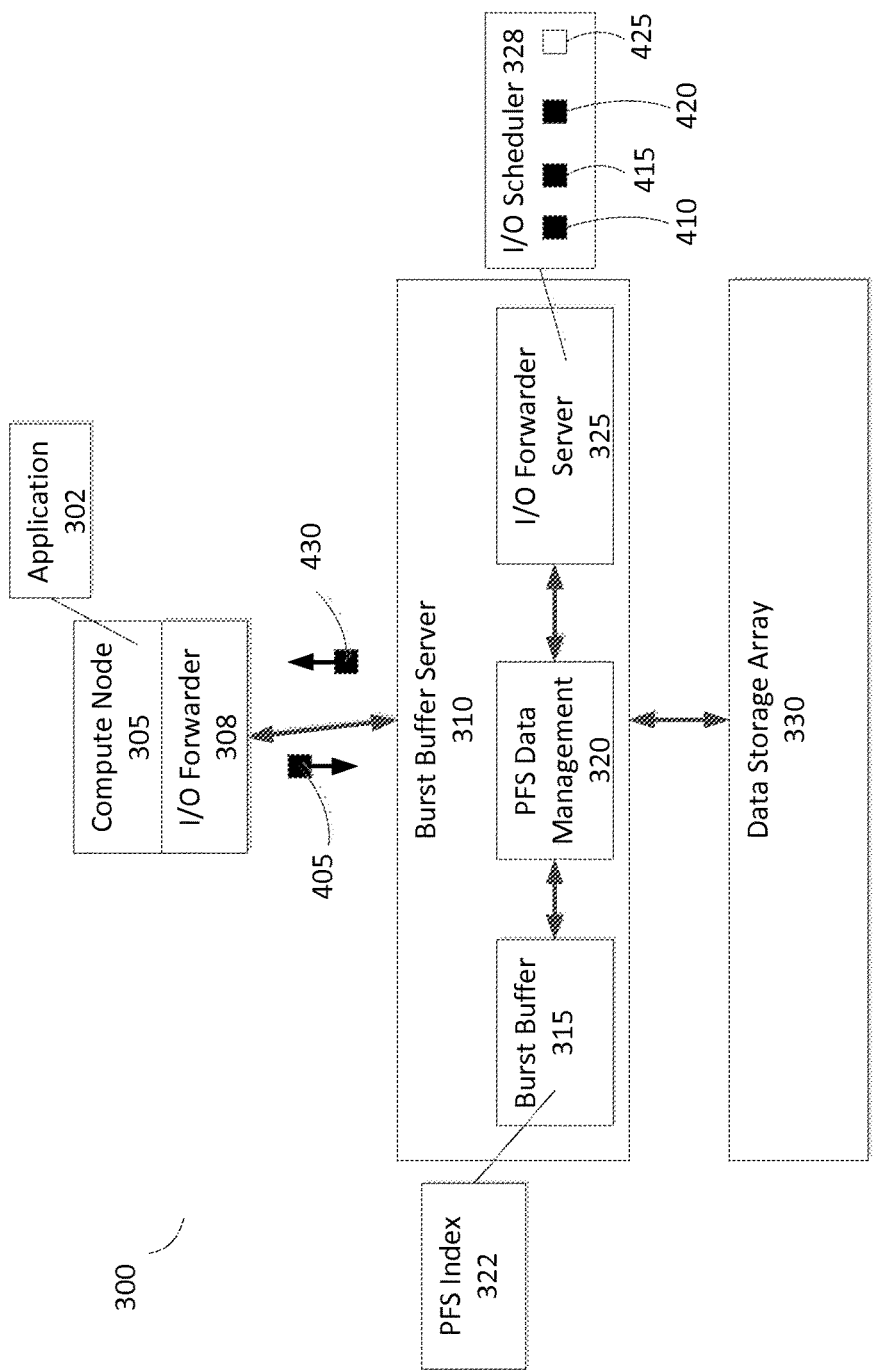
FIG. 4 is a simplified illustration of a POSIX compliant application sending read and write I/O requests to a data storage system, in accordance with an embodiment of the present disclosure.

Refer to the example embodiment of FIG. 4. FIG. 4 is a simplified illustration of a POSIX compliant application sending read and write I/O requests to a data storage system, in accordance with an embodiment of the present disclosure. As shown, Data storage system 300 includes burst buffer server 310 and data storage array 330. Compute node 305 is in communication with burst buffer server 310 and includes I/O forwarder client 308. Application 302 is executing on compute node 305 and is utilizing I/O Forwarder client 308 to send read and write I/O requests to burst buffer server 310. Application 302 sends POSIX compliant messages to I/O Forwarder client 308. I/O Forwarder client 308 sends the POSIX compliant messages to I/O forwarder server module 325 within Burst Buffer Server 310. Application 302 sends a read I/O request, via I/O Forwarder client 308, in message 405 to I/O Forwarder server module 325. I/O Forwarder server module 325 analyzes received message and places read I/O request within block 425 in I/O Scheduler 328. As shown, I/O scheduler 328 includes write I/O requests within blocks 410, 415, 420. I/O Forwarder server module 325 is enabled to determine which blocks within I/O scheduler 328 are to be written before Read I/O request within block 425 is enabled to be executed. Upon execution of read I/O request within block 425, I/O Forwarder server module 325 responds to read I/O request in message 430 to Compute node 305.

Figure 5:
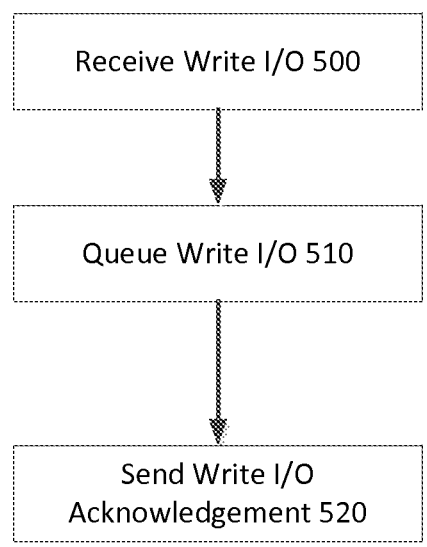
FIG. 5 is a simplified flowchart of a method of sending write I/Os to a data storage system as shown in FIG. 3, in accordance with an embodiment of the present disclosure.

Refer to the example embodiments of FIGS. 3 and 5. FIG. 5 is a simplified flowchart of a method of sending write I/Os to a data storage system as shown in FIG. 3, in accordance with an embodiment of the present disclosure. As shown in FIG. 3, I/O Forwarder server module 325 receives a write I/O request in message 340 (Step 500) from Application 302, via I/O Forwarder client 308. I/O Forwarder server module 325 queues the received write I/O Request (Step 520) using I/O Scheduler 328. I/O Forwarder server module 325 sends an acknowledgment to Application 302 (Step 520), via I/O Forwarder client 308, in response to the write I/O request to enable Application 302 to continue executing.

Figure 6:
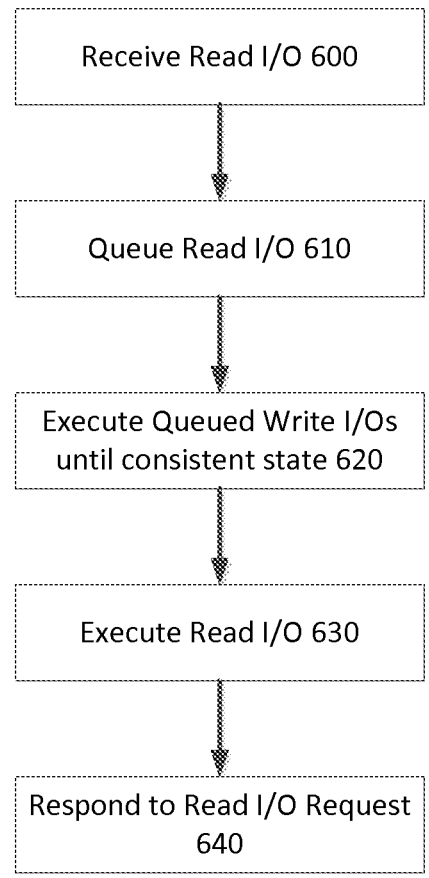
FIG. 6 is a simplified flowchart of a method of sending read and write I/Os to a data storage system of FIG. 4, in accordance with an embodiment of the present disclosure.

Refer to the example embodiments of FIGS. 4 and 6. FIG. 6 is a simplified flowchart of a method of sending read and write I/Os to a data storage system of FIG. 4, in accordance with an embodiment of the present disclosure. As shown in FIG. 4, I/O Forwarder server module 325 receives read I/O request in message 405 (Step 600). I/O Forwarder server module 325 analyzes received read I/O request and queues read I/O request (Step 610) in I/O scheduler in block 425. I/O Forwarder server module 325 executes queued write I/Os in blocks 410, 415, 425 until a consistent state for data storage managed by PFS data management module 320 is reached (Step 620). Once a consistent state is reached, I/O Forwarder server module 325 executes read I/O request (Step 630) in block 425 by sending block 425 to PFS data management module 320 and responds to the received I/O request in message 430 (Step 640).

Figure 7:
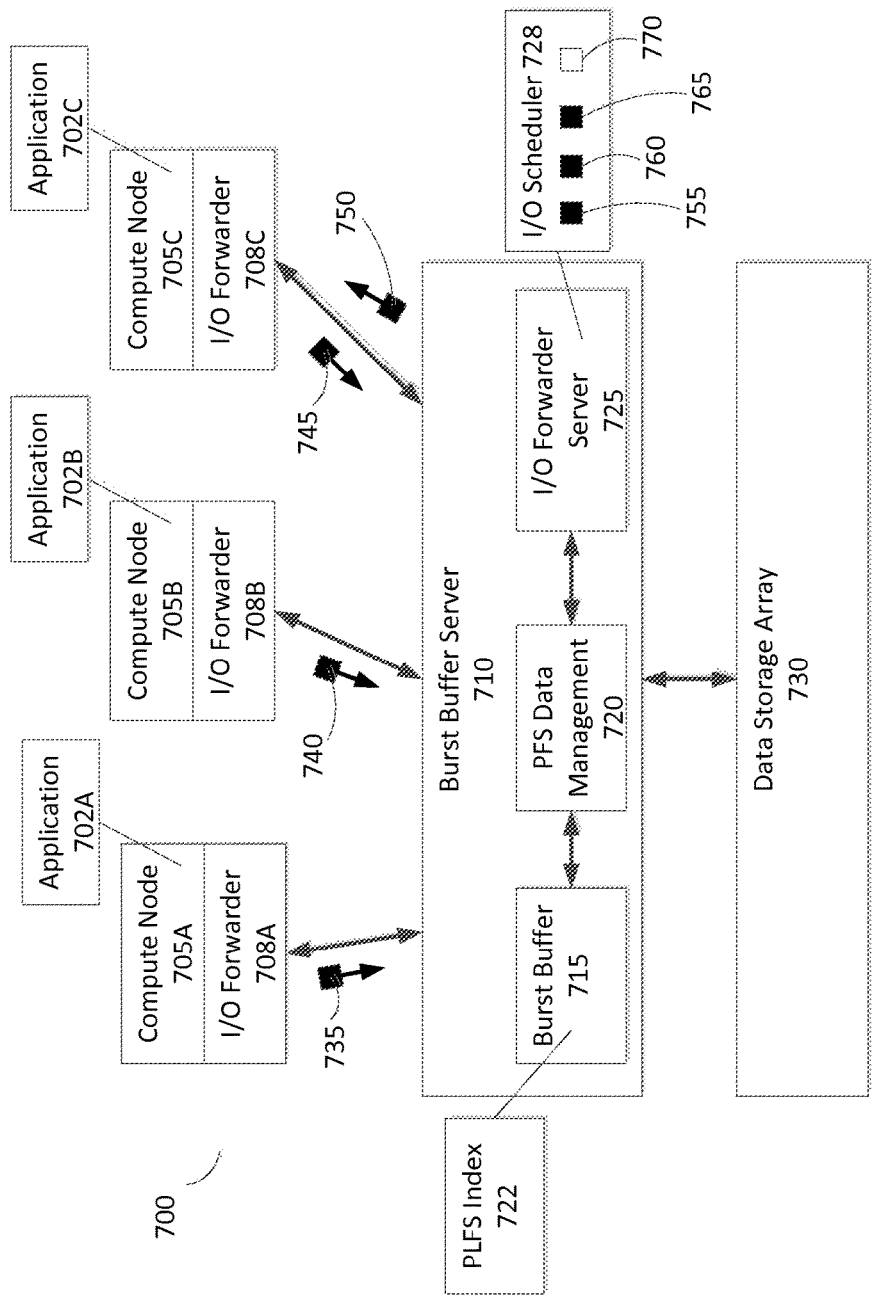
FIG. 7 is a simplified illustration of multiple POSIX compliant Applications utilizing a data storage system, in accordance with an embodiment of the present disclosure.

Refer to the example embodiment of FIG. 7. FIG. 7 is a simplified illustration of multiple POSIX compliant Applications utilizing a data storage system, in accordance with an embodiment of the present disclosure. Data storage system 700 includes burst buffer server 710 and data storage array 730. Data storage array 730 is in communication with burst buffer server 710. Compute nodes (705A-C, 705 Generally) are in communication with Burst Buffer server 710. Compute node 705A includes I/O forwarder client 708A and is executing Application 702A, which is POSIX Compliant.

Compute node 705B includes I/O Forwarder client 708B and is executing Application 702B, a POSIX Compliant application. Compute node 705C includes I/O forwarder client 708C and is executing Application 702C, which is POSIX Compliant.

As shown, Application 702A is sending a write I/O request to burst buffer server 710 using message 735. I/O Forwarder server module 725 receives the write I/O request in message 735 and places the request in block 755. I/O Forwarder server module 725 sends an acknowledgement to Application 702A to enable Application 702A to continue executing. Application 702B is sending a write I/O request to burst buffer server 710 using message 740. I/O Forwarder server module 725 receives the write I/O request in message 740 and places the requests in block 760 and block 765. I/O Forwarder server module 725 sends an acknowledgment to application 702B to enable Application 702B to continue executing. Application 702C sends a read I/O request to burst buffer server 710, via I/O forwarder client 708C, using message 745. I/O Forwarder server module 725 receives the read I/O request in message 745 and places the read request in block 770. I/O Forwarder server module 725 determines which write requests need to be completed before data stored and/or managed by PFS Data management module 720 is consistent. I/O Forwarder server module 725 sends selected write requests to PFS data management module 720 to complete the write I/O request. Upon completion of all write I/O requests received before the read I/O request, I/O Forwarder server module 725 sends read I/O request in block 770 to PFS data management module 720 to complete the read I/O request. Upon completion of the read I/O Request, I/O Forwarder server module 725 responds to application 702C using message 750. Message 750 includes the requested data I/O.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 8:
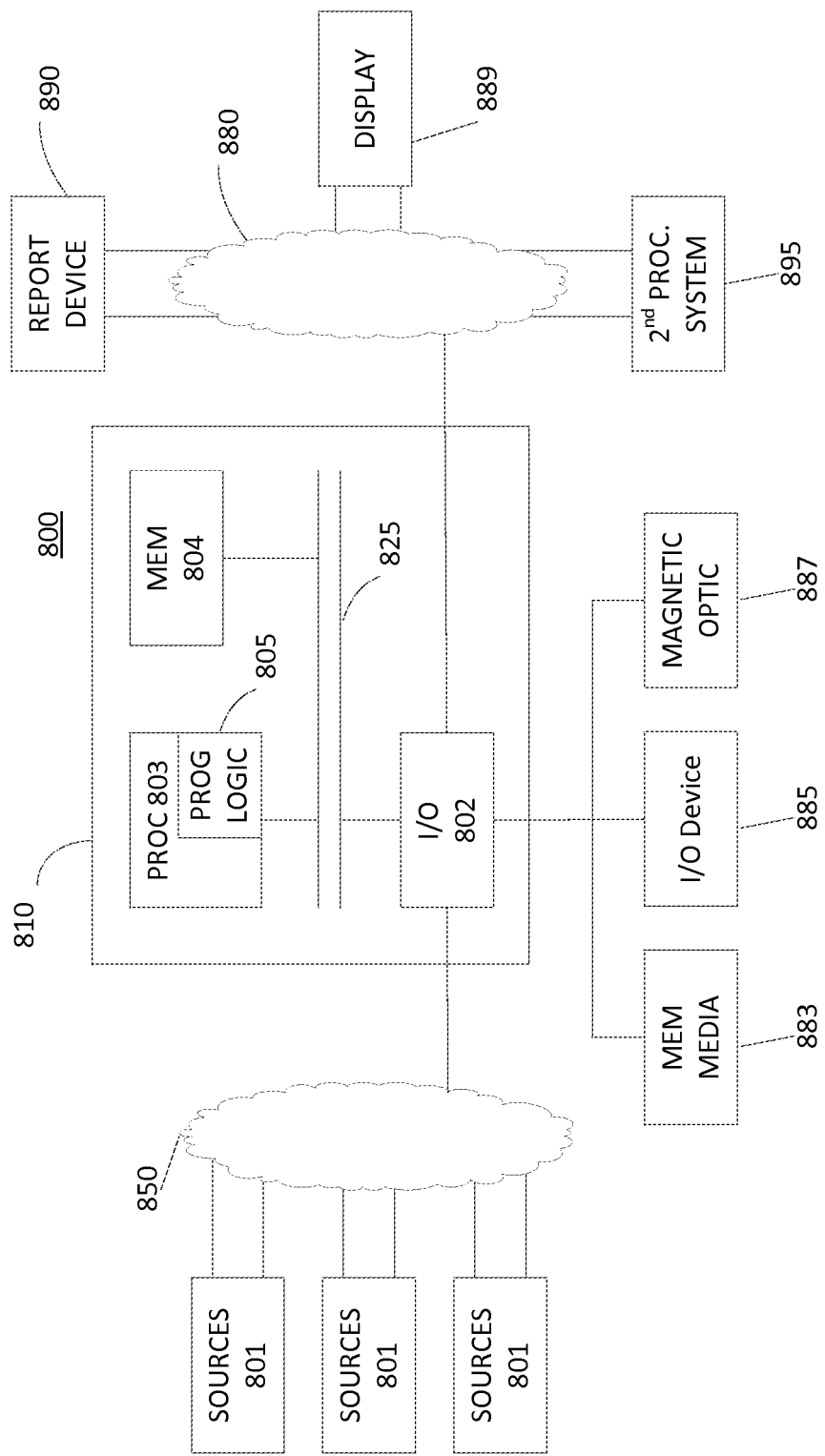
FIG. 8 is an example of an embodiment of an apparatus that may utilize the techniques described herein, in accordance with an embodiment of the present disclosure.

FIG. 8 is a block diagram illustrating an apparatus, such as a computer 810 in a network 800, which may utilize the techniques described herein according to an example embodiment of the present invention. The computer 810 may include one or more I/O ports 802, a processor 803, and memory 804, all of which may be connected by an interconnect 825, such as a bus. Processor 803 may include program logic 805. The I/O port 802 may provide connectivity to memory media 883, I/O devices 885, and drives 887, such as magnetic or optical drives. When the program code is loaded into memory 804 and executed by the computer 810, the machine becomes an apparatus for practicing the invention. When implemented on one or more general-purpose processors 803, the program code combines with such a processor to provide a unique apparatus that operates analogously to specific logic circuits. As such, a general purpose digital machine can be transformed into a special purpose digital machine.

Figure 9:
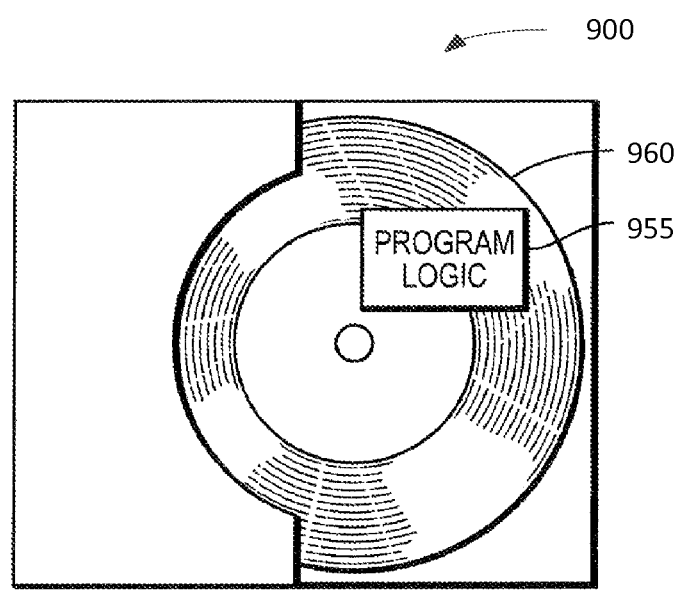
FIG. 9 is an example of a method embodied on a computer readable storage medium that may utilize the techniques described herein, in accordance with an embodiment of the present disclosure.

FIG. 9 is a block diagram illustrating a method embodied on a computer readable storage medium 960 that may utilize the techniques described herein according to an example embodiment of the present invention. FIG. 9 shows Program Logic 955 embodied on a computer-readable medium 960 as shown, and wherein the Logic is encoded in computer-executable code configured for carrying out the methods of this invention and thereby forming a Computer Program Product 900. Program Logic 955 may be the same logic 805 on memory 804 loaded on processor 803 in FIG. 8. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing I/Os from a legacy Portable Operating System Interface (POSIX) compliant Application configured to communicate with a centralized data storage system, wherein the Application is allowed to operate asynchronously, on a host, wherein the host is in communication with a distributed data storage system including a burst buffer node and a data storage array, the computer-executable method comprising:

asynchronously receiving a POSIX compliant message from the Application, wherein the message is associated with data on the data storage array within the distributed data storage system;

wherein the burst buffer node is enabled to receive POSIX compliant messages asynchronously and wherein the burst buffer node includes an I/O forwarding node enabled to synchronize I/Os or maintain POSIX compliance for the one or more computers in communication with the distributed data storage system; and asynchronously processing the POSIX message using the burst buffer node to manage a data I/O from the message for the data storage array within the distributed data storage system.

2. The computer-executable method of claim 1, wherein the POSIX message is a write I/O request or a read I/O request.

3. The computer-executable method of claim 2, wherein the processing comprises:

sending a write I/O acknowledgment; and queuing the write I/O request at the distributed data storage system.

4. The computer-executable method of claim 3, wherein the processing further comprises:

executing write I/O requests queued at the distributed data storage system.

5. The computer-executable method of claim 2, wherein the processing comprises queuing the read I/O request at the distributed data storage system.

6. The computer-executable method of claim 5, wherein the processing further comprises:

determining whether data storage array on the distributed data storage system is in a consistent state; and upon a positive determination, processing the read I/O request.

7. The method of claim 1 wherein the Application employs either a strict locking protocol, a tight locking mechanism, or a metadata synchronization protocol.

8. A system, comprising:
- a host executing a legacy Portable Operating System Interface (POSIX) compliant Application configured to communicate with a centralized data storage system;
- a distributed data storage system in communication with the host, wherein the distributed data storage system includes a burst buffer and a data storage array; and
- computer-executable program logic encoded in memory of one or more computers in communication with the distributed data storage system to enable management of I/Os from the legacy POSIX compliant Application, wherein the computer-executable program logic is configured for the execution of:
- asynchronously receiving a POSIX compliant message from the Application, wherein the Application is allowed to operate asynchronously, and wherein the message is associated with data on the data storage array within the distributed data storage system;
- wherein the burst buffer node is enabled to receive POSIX compliant messages asynchronously, and wherein the burst buffer node includes an I/O forwarding node enabled to synchronize I/Os or maintain POSIX compliance for the one or more computers in communication with the distributed data storage system; and
- asynchronously processing the POSIX message using the burst buffer node to manage a data I/O from the message for the data storage array within the distributed data storage system.

9. The system of claim 8, wherein the POSIX message is a write I/O request or a read I/O request.

10. The system of claim 9, wherein the processing comprises:
- sending a write I/O acknowledgment; and
- queuing the write I/O request at the distributed data storage system.

11. The system of claim 10, wherein the processing further comprises: executing write I/O requests queued at the distributed data storage system.

12. The system of claim 9, wherein the processing comprises queuing the read I/O request at the distributed data storage system.

13. The system of claim 12, wherein the processing further comprises: determining whether data storage array on the distributed data storage system is in a consistent state; and upon a positive determination, processing the read I/O request.

14. The system of claim 8 wherein the Application employs either a strict locking protocol, a tight locking mechanism, or a metadata synchronization protocol.

15. A computer program product for managing I/Os from a legacy Portable Operating System Interface (POSIX) compliant Application configured to communicate with a centralized data storage system on a host, wherein the Application is allowed to operate asynchronously, and wherein the host is in communication with a distributed data storage system including a burst buffer node and a data storage array, the computer program product comprising:
- a non-transitory computer readable medium encoded with computer-executable program code, the code configured to enable the execution of:
- asynchronously receiving a POSIX compliant message from the Application, wherein the message is associated with data on the data storage array within the distributed data storage system;
- wherein the burst buffer node is enabled to receive POSIX compliant messages asynchronously, and wherein the burst buffer node includes an I/O forwarding node enabled to synchronize I/Os or maintain POSIX compliance for the one or more computers in communication with the distributed data storage system; and
- asynchronously processing the POSIX message using the burst buffer node to manage a data I/O from the message for the data storage array within the distributed data storage system.

16. The computer program product of claim 15, wherein the POSIX message is a write I/O request or a read I/O request.

17. The computer program product of claim 16, wherein the processing comprises queuing the read I/O request at the data storage system.

18. The computer program product of claim 15, wherein the processing comprises: sending a write I/O acknowledgment; and queuing the write I/O request at the distributed data storage system.

19. The computer program product of claim 18, wherein the processing further comprises: executing write I/O requests queued at the distributed data storage system.

20. The computer program product of claim 15 wherein the Application employs either a strict locking protocol, a tight locking mechanism, or a metadata synchronization protocol.

* * * * *